(12) United States Patent
Tomioka

(10) Patent No.: US 7,164,539 B2
(45) Date of Patent: Jan. 16, 2007

(54) THREE-GROUP ZOOM LENS

(75) Inventor: Ryoko Tomioka, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/155,553

(22) Filed: Jun. 20, 2005

(65) Prior Publication Data

US 2005/0286140 A1 Dec. 29, 2005

(30) Foreign Application Priority Data

Jun. 24, 2004 (JP) ............................. 2004-185868

(51) Int. Cl.
*G02B 15/14* (2006.01)
(52) U.S. Cl. ..................................... 359/682; 359/684
(58) Field of Classification Search ................ 359/682, 359/684, 689
See application file for complete search history.

(56) References Cited

U.S. PATENT DOCUMENTS

| | | | | |
|---|---|---|---|---|
| 6,785,057 B1 * | 8/2004 | Ori | ............................. | 359/689 |
| 6,919,994 B1 * | 7/2005 | Tanaka | ........................ | 359/689 |
| 6,943,960 B1 * | 9/2005 | Ori et al. | ..................... | 359/684 |
| 6,982,834 B1 * | 1/2006 | Sato | ............................ | 359/682 |
| 6,985,300 B1 * | 1/2006 | Sato | ............................ | 359/680 |
| 6,995,924 B1 * | 2/2006 | Sato | ............................ | 359/689 |

FOREIGN PATENT DOCUMENTS

| JP | 2000-284177 | 10/2000 |
|---|---|---|
| JP | 2004-93647 | 3/2004 |

\* cited by examiner

*Primary Examiner*—David N. Spector
(74) *Attorney, Agent, or Firm*—Arnold International; Jon W. Henry; Bruce Y. Arnold

(57) ABSTRACT

A three-group zoom lens includes five lens components and six lens elements. The first lens group from the object side has negative refractive power and both the second lens group, which includes a stop, and the third lens group from the object side have positive refractive powers. The first and second lens groups each include an aspheric surface. During zooming, the first lens group moves nearer the second lens group while the second lens group moves farther from the third lens group. The third lens group moves toward the object side when focusing from an object at infinity to a nearby object. The three lens groups have particular lens element constructions, and lens elements of the second and third lens groups satisfy certain conditions related to their focal lengths, Abbe numbers, and the focal length of the zoom lens.

12 Claims, 4 Drawing Sheets

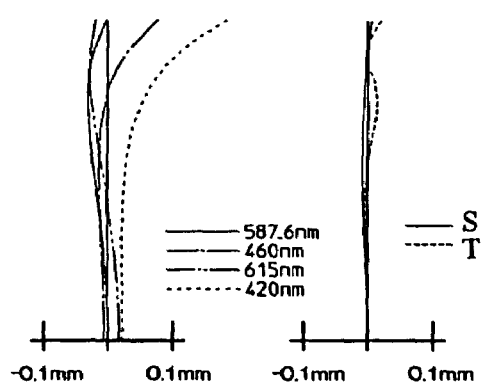
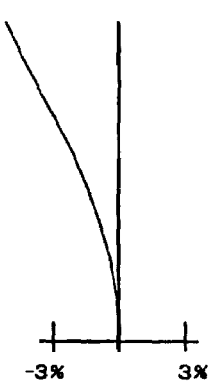
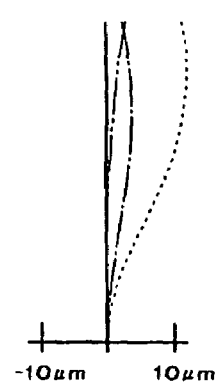
Fig. 2A　　Fig. 2B　　Fig. 2C　　Fig. 2D
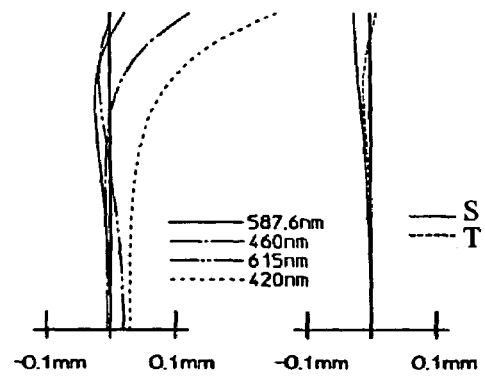
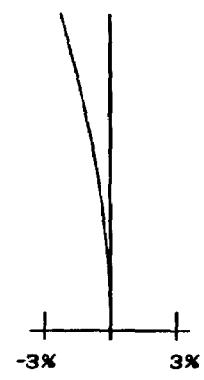
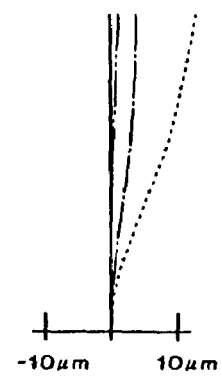
Fig. 3A　　Fig. 3B　　Fig. 3C　　Fig. 3D
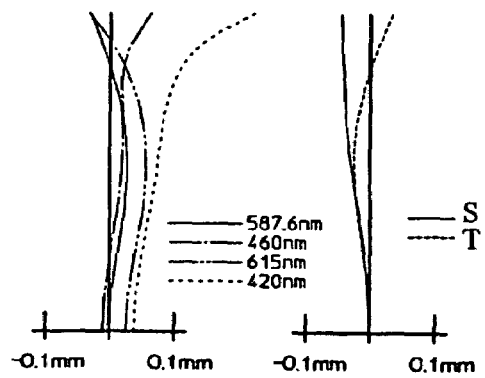
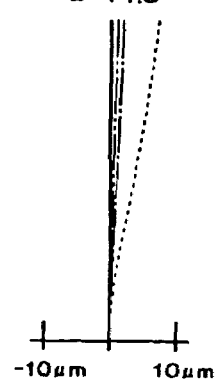
Fig. 4A　　Fig. 4B　　Fig. 4C　　Fig. 4D

THREE-GROUP ZOOM LENS

FIELD OF THE INVENTION

The present invention relates to a zoom lens, especially to a three-group zoom lens that is suitable for use in cameras such as digital cameras and video cameras.

BACKGROUND OF THE INVENTION

In the past, the three-group zoom lens has been known as a zoom lens for various kinds of cameras. An effort has been made to miniaturize this three-group zoom lens and use it widely from the perspective of better aberration correction. For digital cameras and video cameras that have rapidly come into wide use in recent years, there has been a demand for miniaturization, higher resolution, lower distortion, and a reduced cost for this lens in the same way as similar demands for lenses used in cameras generally.

At the same time, autofocus has been the main trend for digital cameras and video cameras, and there has been demand for faster focusing speed. For this reason, the inner focus type or the rear focus type of lens, which allows lighter lenses to be made and makes the driving operation easier by keeping the lens close to the camera body, has been used quite often as the focusing method of the zoom lens. In these arrangements, with regard to the number of lens groups, a three-group construction is preferred over a two-group construction.

This type of three-group zoom lens, which adopts a rear focus method that allows faster focusing and miniaturization, that provides favorable aberration correction while achieving higher resolution has been disclosed, for example, in Japanese Laid-Open Patent Application 2000-284177 and Japanese Laid-Open Patent Application 2004-93647.

However, in recent years, there has been demand for a three-group zoom lens that provides further miniaturization and further reduced cost of the optical system. In trying to achieve these results, with the construction described in Japanese Laid-Open Patent Application 2000-284177, the space between the second lens group and the third lens group from the object side of the zoom lens remains nearly the same during zooming. Since focusing is performed by the third lens group, the space between the second lens group and the third lens group must therefore be maintained during both zooming and focusing and therefore it is difficult to shorten the length of the zoom lens at the time of retraction when the lens barrel frame construction is considered. Furthermore, because a cemented lens is not used within the second lens group, the total length of the optical system cannot be shortened at the time of retraction by the amount of an air space that a cemented lens component would eliminate.

Also, a plastic, that is, a synthetic resin, may be considered for use as a lens material in order to achieve lower cost. However, when a lens is composed of plastic, reflectance becomes larger in comparison with a lens composed of optical glass even if an anti-reflection coating is applied. Because of this, a ghost is generated by the reflected light and the image quality deteriorates.

Furthermore, when a picture is taken where there is insufficient light, it is necessary to supplement the insufficient quantity of light by amplifying the quantity of light for the wavelength region where the quantity of light is primarily insufficient. For instance, if the wavelength region where the quantity of light is insufficient is around 420 nm, there is no particular problem when the correction of the quantity of light is not performed because the sensitivity of a human eye is smaller in relation to a short wavelength region of around 420 nm. However, when the quantity of light of the corresponding short wavelength region is amplified, the chromatic aberration may sometimes be prominent. Therefore, it is necessary in such a case to correct the chromatic aberration around 420 nm.

Furthermore, such inconvenience has been difficult to resolve even with the construction described in the aforementioned Japanese Laid-Open Patent Application 2004-93647.

BRIEF SUMMARY OF THE INVENTION

The present invention relates to a three-group zoom lens that has a zoom ratio of about three, with a short total retracted length, high resolution capability and picture quality, and including favorable correction of various aberrations.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2D show the spherical aberration, astigmatism, distortion, and lateral color, respectively, of the zoom lens according to Embodiment 1 at the wide-angle end;

FIGS. 3A–3D show the spherical aberration, astigmatism, distortion, and lateral color, respectively, of the zoom lens according to Embodiment 1 at an intermediate setting;

FIGS. 4A–4D show the spherical aberration, astigmatism, distortion, and lateral color, respectively, of the zoom lens according to Embodiment 1 at the telephoto end;

DETAILED DESCRIPTION

Figure 1:
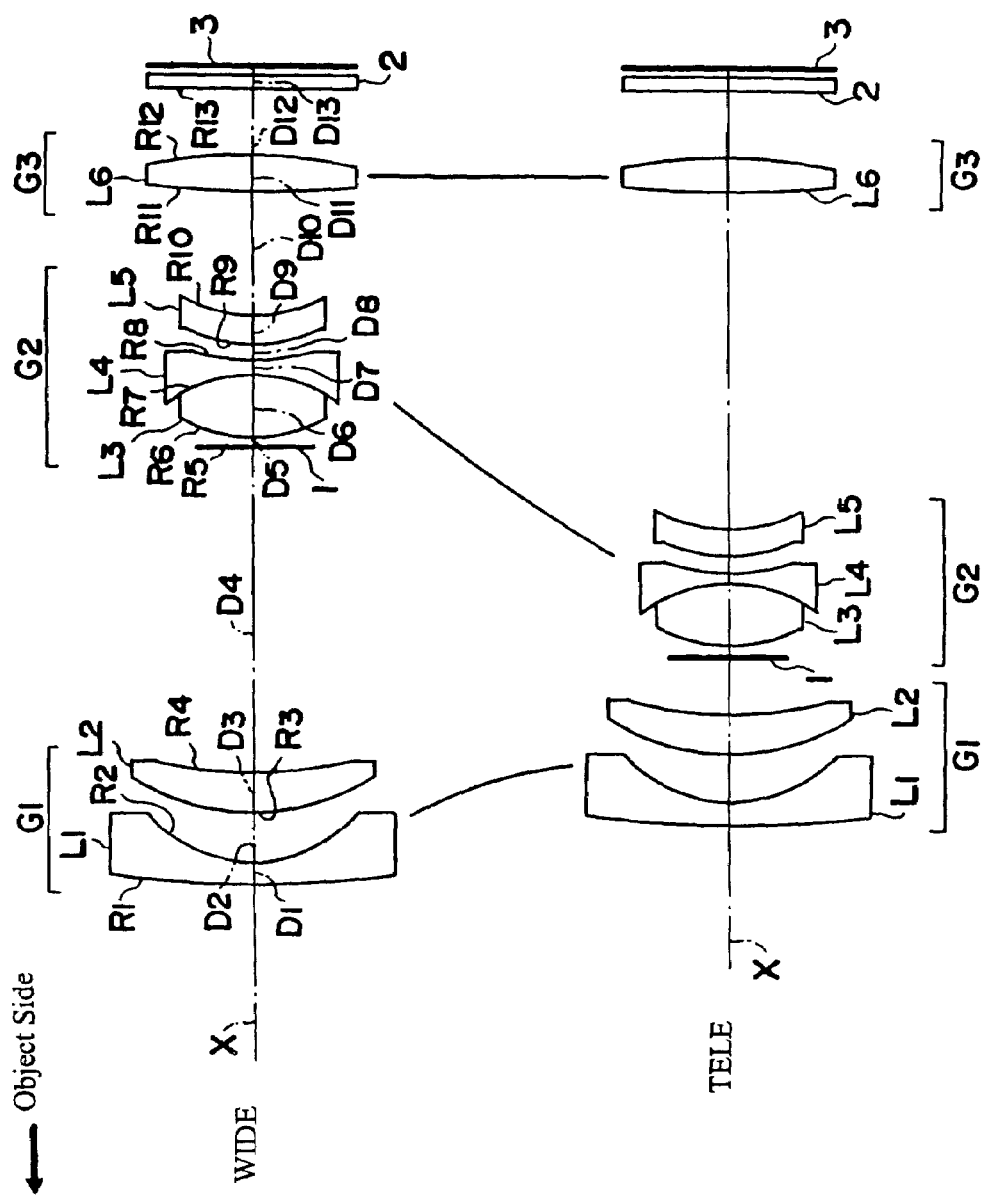
FIG. 1 shows a cross-sectional view of Embodiment 1 of the zoom lens of the present invention at the wide-angle end (WIDE) and the telephoto end (TELE), as well as the movement of the lens groups between these zoom positions.

A general description of the lens of the present invention that pertains to disclosed embodiments of the invention will now be described with reference to FIG. 1 that shows Embodiment 1. A horizontal arrow at the upper left of FIG. 1 that points left indicates the object side of the lens. In FIG. 1, lens elements are referenced by the letter L followed by a number denoting their order from the object side of the lens along the optical axis X, from L1 to L6. Similarly, the radii of curvature of the optical surfaces are referenced by the letter R followed by a number denoting their order from the object side of the lens, from R1 to R13. The on-axis surface spacings along the optical axis X of the various optical surfaces are referenced by the letter D followed by a number denoting their order from the object side of the lens, from D1 to D13. In a similar manner, three lens groups are labeled G1, G2, and G3 in order from the object side of the zoom lens, and the lens elements and lens components belonging to each lens group are indicated by brackets adjacent the labels G1, G2, and G3.

The term "lens group" is defined in terms of "lens elements" and "lens components" as explained herein. The term "lens element" is herein defined as a single transparent mass of refractive material having two opposed refracting surfaces that are oriented at least generally transverse to the optical axis of the zoom lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or overall so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component." Alternatively, a lens component may frequently be made by cementing together two lens elements. The term "lens group" is herein defined as an assembly of one or more lens components in optical series and with no intervening lens components along an optical axis that during zooming is movable as a single unit relative to another lens component or other lens components.

As shown in FIG. 1, the three-group zoom lens of the present invention includes, arranged along an optical axis in order from the object side, a first lens group G1 having negative refractive power, a second lens group G2 having positive refractive power, and a third lens group G3 having positive refractive power. The second lens group G2 includes a stop, such as a diaphragm, on its object side that controls the amount of light that passes through the zoom lens. A filter 2, such as an infrared cut-off filter, is provided on the image side of the third lens group G3.

The three-group zoom lens is constructed so that, when zooming from the wide-angle end (WIDE) to the telephoto end (TELE), the first lens group moves closer to the second lens group, the third lens group remains stationary, and the second lens group moves so that the second lens group and the third lens group become farther apart, as illustrated in FIG. 1. Additionally, the third lens group moves toward the object side when changing the focus from a distant object to a nearby object.

As shown in FIG. 1, the first lens group includes, in order from the object side, a lens element L1 having negative refractive power and having a meniscus shape with the concave surface on the image side and a second lens element L2 having positive refractive power and having a meniscus shape with the convex surface on the object side. The second lens group includes, in order from the object side, a third lens element L3 that is biconvex, a fourth lens element L4 that is biconcave and that is cemented to the biconvex lens element L3, and a fifth lens element L5 that forms a separate lens component having positive refractive power and having a meniscus shape with its convex surface on the object side. The third lens group includes a sixth lens element L6 having a biconvex shape.

Furthermore, the first lens group G1 and the second lens group G2 each include at least one aspheric surface. More specifically, in Embodiments 1, 2, and 3, described more fully below, both surfaces of the first lens element L1 and of the fifth lens element L5 are aspheric surfaces. In addition, the lens surfaces that are aspheric are defined using the following equation:

$$Z = (Y^2/R)/[1+\{1-K \cdot Y^2/R^2\}^{1/2}] + \Sigma(A_i \cdot Y^i) \qquad \text{Equation (A)}$$

where

Z is the length (in mm) of a line drawn from a point on the aspheric lens surface at a distance Y from the optical axis to the tangential plane of the aspheric surface vertex, R is the radius of curvature (in mm) of the aspheric lens surface on the optical axis, Y is the distance (in mm) from the optical axis, K is the eccentricity, and $A_i$ is the ith aspheric coefficient and the summation extends over i.

In Embodiments 1–3 of the present invention that will be described below, aspheric coefficients other than those listed are zero. In Embodiments 1–3, for the two aspheric surfaces of the first lens element L1, aspheric coefficients $A_3$–$A_{10}$ are non-zero. By including odd order aspheric terms in Equation (A) above, the degree of freedom in the design of the shape of the aspheric surfaces of the first lens element L1 is increased, which allows even more favorable correction of aberrations. In Embodiments 1–3, for the two aspheric surfaces of the fifth lens element L5, only the aspheric coefficients $A_4$, $A_6$, $A_8$, and $A_{10}$ are non-zero. Additionally, the fifth lens element L5 and the sixth lens element L6 are made of plastic.

In the three-group zoom lens of the present invention, the luminous flux that enters from the object side along the optical axis X forms an image at an imaging surface (image pickup surface) 3 where an image pickup element (not shown in the drawings), such as a CCD, is positioned.

Additionally, the three-group zoom lens of the present invention is constructed so that the following conditions are satisfied:

$\nu 3 - \nu 4 > 15$ \hfill Condition (1)

$|f3/\nu 3 + f4/\nu 4| < 0.07$ \hfill Condition (2)

$|fw/f5| < 0.18$ \hfill Condition (3)

where $\nu 3$ is the Abbe number at the d-line of the biconvex lens element (L3) of the second lens group G2;

$\nu 4$ is the Abbe number at the d-line of the biconcave lens element (L4) of the second lens group G2;

f3 is the focal length of the biconvex lens element (L3) of the second lens group G2;

f4 is the focal length of the biconcave lens element (L4) of the second lens group G2;

fw is the focal length of the zoom lens at the wide-angle end;

f5 is the focal length of the lens element (L5) of the second lens group (G2) that forms a separate lens component; and R11 is the radius of curvature of the object-side surface of the lens element having positive refractive power (L6) of the third lens group G3.

Additionally, the following Condition (4) is preferably satisfied:

$$R11/fw > 6.5 \quad \text{Condition (4)}$$

where

R11 is the radius of curvature of the object-side surface of the lens element having positive refractive power (L6) of the third lens group G3.

The technical significance of Conditions (1)–(4) defined above is described below. By satisfying Condition (1), the axial chromatic aberration at the telephoto end and lateral color at the wide-angle end can be favorably corrected.

By satisfying Condition (2), the axial chromatic aberration at the telephoto end for shorter wavelengths, especially around 420 nm, can be corrected favorably.

When the fifth lens element L5 (i.e., the single lens element that is a lens component of the second lens group G2) is made of plastic, focal plane shifts due to temperature changes can be minimized by satisfying Condition (3).

Additionally, if a lens element is made of plastic, a non-rotationally symmetric refractive index distribution in the lens element is generated when molding, and this causes astigmatic differences. The astigmatic differences can be corrected by forming the fifth lens element L5 and the sixth lens element L6 of plastic and by combining the optimal rotational directions of the fifth lens element L5 and the sixth lens element L6.

Satisfying Condition (4) helps reduce ghost images generated by the reflection at the object-side surface of the sixth lens element L6 that may be especially pronounced when the sixth lens element L6 is made of plastic. That is, when the sixth lens element L6 is made of plastic, the reflectance becomes higher in comparison to a lens element made of optical glass, even if an anti-reflection coating were to be applied to the plastic lens element in order to reduce the generation of ghost images. Together with reducing the generation of ghost images due to reflection at the object-side surface of the sixth lens element L6, satisfying Condition (4) contributes to reduction in costs and improvement in picture quality even when the sixth lens element L6 is made of plastic.

According to the three-group zoom lens of the present invention, the space between the second lens group G2 and the third lens group G3 can be reduced at the time of retraction and the total length of the zoom lens at the time of retraction can be shortened.

Furthermore, by constructing each of the lens groups G1–G3 as described above, the various aberrations can be favorably corrected even though the zoom lens includes only six lens elements.

Additionally, by using cemented lens elements in the second lens group G2, the length of the second lens group G2 can be reduced, which enables the total length of the zoom lens at the time of retraction to be further shortened.

In summary, the three-group zoom lens of the present invention has a zoom ratio of about three, a short length when retracted, and sufficiently high resolution capability and high picture quality with favorable correction of various aberrations, all of which can be achieved while maintaining low costs of production of the zoom lens.

Embodiments 1–3 of the present invention will now be individually described with further reference to the drawings.

Embodiment 1

FIG. 1 shows a cross-sectional view of the three-group zoom lens of Embodiment 1 of the present invention. Table 1 below lists the surface number # in order from the object side, the radius of curvature R (in mm) of each surface on the optical axis, the on-axis surface spacing D (in mm), as well as the refractive index $N_d$ and the Abbe number $v_d$ (both at the d-line of 587.6 nm) of each optical element for Embodiment 1. Listed in the bottom portion of Table 1 are the focal length f (in mm) and the f-number $F_{NO}$ at the wide-angle end and at the telephoto end, and the maximum field angle 2ω at the wide-angle end and at the telephoto end for Embodiment 1.

TABLE 1

| # | R | D | $N_d$ | $v_d$ |
|---|---|---|---|---|
| 1* | 167.0997 | 1.10 | 1.80348 | 40.4 |
| 2* | 5.9421 | 2.51 | | |
| 3 | 9.6462 | 2.07 | 1.92286 | 20.9 |
| 4 | 17.7149 | D4 (variable) | | |
| 5 | ∞ | 0.50 | | |
| 6 | 6.1340 | 3.40 | 1.74400 | 44.8 |
| 7 | −6.1340 | 0.56 | 1.72825 | 28.5 |
| 8 | 9.0753 | 0.88 | | |
| 9* | 6.2072 | 1.43 | 1.50842 | 56.4 |
| 10* | 8.1134 | D10 (variable) | | |
| 11 | 45.8165 | 1.82 | 1.50842 | 56.4 |
| 12 | −24.5862 | 3.76 | | |
| 13 | ∞ | 0.85 | 1.51680 | 64.2 |
| f = 6.25–17.25 | | $F_{NO}$ = 2.9–4.9 | 2ω = 62.4°–23.8° | |

The lens surfaces with a * to the right of the surface number in Table 1 are aspheric lens surfaces, and the aspheric surface shape of these lens surfaces is expressed by Equation (A) above.

Table 2 below lists the values of the constant K and the aspheric coefficients $A_3$–$A_{10}$ used in Equation (A) above for each of the aspheric lens surfaces of Table 1. Aspheric coefficients that are not present in Table 2 are zero. An "E" in the data indicates that the number following the "E" is the exponent to the base 10. For example, "1.0E-2" represents the number $1.0 \times 10^{-2}$.

TABLE 2

| # | K | $A_3$ | $A_4$ | $A_5$ | $A_6$ |
|---|---|---|---|---|---|
| 1 | 1.3768198 | −1.1297385E−4 | 1.0626017E−3 | −2.7248054E−4 | −5.4556828E−6 |
| 2 | 1.0110541 | −2.6336681E−4 | 1.1715835E−3 | −4.2952706E−4 | 1.1259434E−5 |
| 9 | −1.424456 | 0 | 1.0273544E−3 | 0 | −7.2795666E−5 |
| 10 | −3.894691 | 0 | 3.5289284E−3 | 0 | −5.1741885E−5 |

TABLE 2-continued

| # | $A_7$ | $A_8$ | $A_9$ | $A_{10}$ |
|---|---|---|---|---|
| 1 | 8.4524491E−6 | 1.3037650E−7 | −2.5312792E−7 | 1.9750514E−8 |
| 2 | 6.8851230E−6 | 4.6507584E−7 | −1.9159540E−7 | −9.9955760E−9 |
| 9 | 0 | −8.5429785E−6 | 0 | −2.6079221E−8 |
| 10 | 0 | −6.2610772E−6 | 0 | −2.2016626E−8 |

In the zoom lens of Embodiment 1, lens groups G1 and G2 move to vary the separations of the three lens groups during zooming. Therefore, the values of the on-axis spacings D4 and D10 (i.e., the group spacings) vary. Table 3 below lists the values of the variables D4 and D10 (in mm) at the wide-angle end (f=6.25 mm), at an intermediate setting (f=8.75 mm), and at the telephoto end (f=17.25 mm).

TABLE 3

| Focal Length | D4 | D10 |
|---|---|---|
| 6.25 | 16.93 | 6.36 |
| 8.75 | 10.64 | 8.87 |
| 17.25 | 2.89 | 17.38 |

Furthermore, as set forth in Table 4 below, the zoom lens of Embodiment 1 of the present invention satisfies all of Conditions (1) through (4) above.

TABLE 4

| Condition No. | Condition | Value |
|---|---|---|
| (1) | ν3 − ν4 > 15 | 16.2 |
| (2) | \| f3/ν3 + f4/ν4 \| < 0.07 | 0.068 |
| (3) | fw/ \| f5 \| < 0.18 | 0.151 |
| (4) | R11/fw > 6.5 | 7.33 |

FIGS. 2A–2D show the spherical aberration, astigmatism, distortion, and lateral color, respectively, of the zoom lens of Embodiment 1 at the wide-angle end with a focal length of 6.25 mm. FIGS. 3A–3D show the spherical aberration, astigmatism, distortion, and lateral color, respectively, of the zoom lens of Embodiment 1 at an intermediate setting with a focal length of 8.75 mm. FIGS. 4A–4D show the spherical aberration, astigmatism, distortion, and lateral color, respectively, of the zoom lens of Embodiment 1 at the telephoto end with a focal length of 17.25 mm. In FIGS. 2A, 3A, and 4A, the spherical aberration (in mm) is shown for the wavelengths 587.6 nm (the d-line), 420 nm, 460 nm, and 615 nm, and the f-number is shown. In the remaining figures, ω is the half-field angle. In FIGS. 2B, 3B, and 4B, the astigmatism (in mm) is shown for both the sagittal image surface S and the tangential image surface T and is measured at 587.6 nm (the d-line). In FIGS. 2C, 3C, and 4C, distortion (in percent) is measured at 587.6 nm (the d-line). In FIGS. 2D, 3D, and 4D, the lateral color (in μm) is shown for the wavelengths 420 nm, 460 nm, and 615 nm relative to 587.6 nm (the d-line).

As is apparent from these figures, the various aberrations are favorably corrected over the entire zoom range for the three-group zoom lens of Embodiment 1.

Embodiment 2

Embodiment 2 is very similar to Embodiment 1 and therefore is well shown by FIG. 1. Embodiment 2 differs from Embodiment 1 in its lens element configuration by having different radii of curvature of the lens surfaces, different aspheric coefficients of the aspheric lens surfaces, some different optical element surface spacings, and some different refractive indexes and Abbe numbers.

Table 5 below lists the surface number # in order from the object side, the radius of curvature R (in mm) of each surface on the optical axis, the on-axis surface spacing D (in mm), as well as the refractive index $N_d$ and the Abbe number $ν_d$ (both at the d-line of 587.6 nm) of each optical element for Embodiment 2. Listed in the bottom portion of Table 5 are the focal length f (in mm) and the f-number $F_{NO}$ at the wide-angle and telephoto ends, and the maximum field angle 2ω at the wide-angle end and at the telephoto end for Embodiment 2.

TABLE 5

| # | R | D | $N_d$ | $ν_d$ |
|---|---|---|---|---|
| 1* | 93.0733 | 1.10 | 1.80348 | 40.4 |
| 2* | 5.9571 | 2.54 | | |
| 3 | 9.0359 | 2.26 | 1.92286 | 20.9 |
| 4 | 14.7655 | D4 (variable) | | |
| 5 | ∞ | 0.50 | | |
| 6 | 5.8956 | 3.17 | 1.71700 | 47.9 |
| 7 | −5.8956 | 0.56 | 1.68893 | 31.1 |
| 8 | 7.9636 | 0.60 | | |
| 9* | 6.1999 | 1.60 | 1.50842 | 56.4 |
| 10* | 8.6540 | D10 (variable) | | |
| 11 | 43.7522 | 1.70 | 1.50842 | 56.4 |
| 12 | −24.0080 | 3.77 | | |
| 13 | ∞ | 1.05 | 1.51680 | 64.2 | f = 6.25–17.19　　$F_{NO}$ = 2.9–4.9　　2ω = 62.4°–24.0°

The lens surfaces with a * to the right of the surface number in Table 5 are aspheric lens surfaces, and the aspheric surface shape of these lens surfaces is expressed by Equation (A) above.

Table 6 below lists the values of the constant K and the aspheric coefficients $A_3$–$A_{10}$ used in Equation (A) above for each of the aspheric lens surfaces of Table 5. Aspheric coefficients that are not present in Table 6 are zero. An "E" in the data indicates that the number following the "E" is the exponent to the base 10. For example, "1.0E-2" represents the number $1.0×10^{−2}$.

TABLE 6

| # | K | $A_3$ | $A_4$ | $A_5$ | $A_6$ |
|---|---|---|---|---|---|
| 1 | 1.3749884 | 5.0159342E−5 | 1.0619328E−3 | −2.6998621E−4 | −8.3456041E−6 |
| 2 | 1.0817313 | −1.0580695E−4 | 1.2426657E−3 | −4.5354506E−4 | 1.1998946E−5 |
| 9 | −0.3169545 | 0 | 3.6962868E−4 | 0 | −5.5289783E−5 |
| 10 | −5.8409111 | 0 | 3.7110017E−3 | 0 | −3.6394132E−5 |

| # | $A_7$ | $A_8$ | $A_9$ | $A_{10}$ |
|---|---|---|---|---|
| 1 | 9.0602175E−6 | 1.9285283E−7 | −2.8113909E−7 | 2.1932867E−8 |
| 2 | 8.2313079E−6 | 3.3808902E−7 | −2.0364604E−7 | −1.0298839E−8 |
| 9 | 0 | −8.5590972E−6 | 0 | −2.9548417E−8 |
| 10 | 0 | −6.1539337E−6 | 0 | −2.3096338E−8 |

In the zoom lens of Embodiment 2, lens groups G1 and G2 move to vary the separations of the three lens groups during zooming. Therefore, the values of the on-axis spacings D4 and D10 (i.e., the group spacings) vary. Table 7 below lists the values of the variables D4 and D10 (in mm) at the wide-angle end (f=6.25 mm), at an intermediate setting (f=8.75 mm), and at the telephoto end (f=17.19 mm).

TABLE 7

| Focal Length | D4 | D10 |
|---|---|---|
| 6.25 | 16.92 | 6.48 |
| 8.75 | 10.75 | 9.01 |
| 17.19 | 3.17 | 17.56 |

Furthermore, as set forth in Table 8 below, the zoom lens of Embodiment 2 of the present invention satisfies all of Conditions (1) through (4) above.

TABLE 8

| Condition No. | Condition | Value |
|---|---|---|
| (1) | ν3 − ν4 > 15 | 16.8 |
| (2) | \| f3/ν3 + f4/ν4 \| < 0.07 | 0.058 |
| (3) | \| fw/ f5 \| < 0.18 | 0.178 |
| (4) | R11/fw > 6.5 | 7.0 |

Figures 5A, 5B, 5C, 5D:
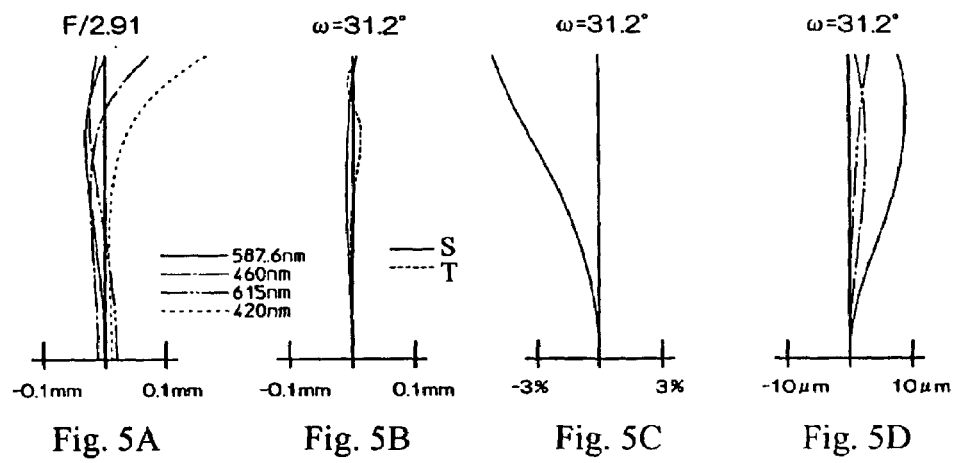
FIGS. 5A–5D show the spherical aberration, astigmatism, distortion, and lateral color, respectively, of the zoom lens according to Embodiment 2 at the wide-angle end.
Figures 6A, 6B, 6C, 6D:
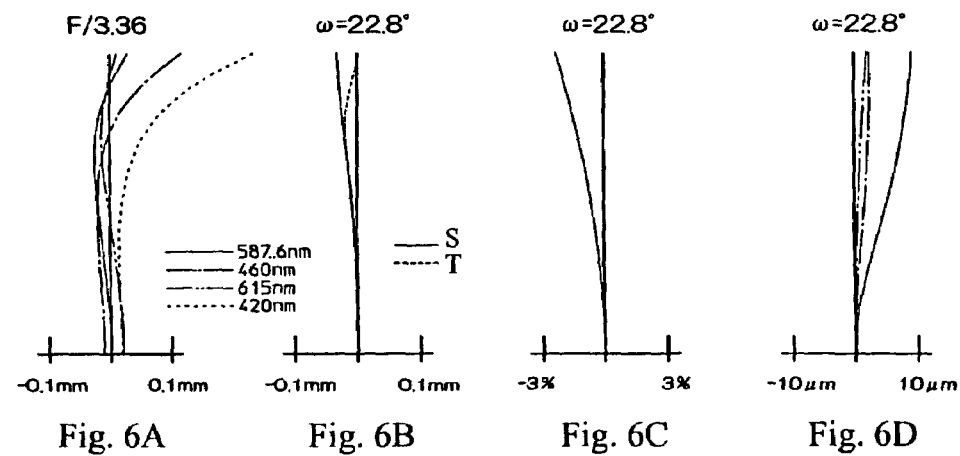
FIGS. 6A–6D show the spherical aberration, astigmatism, distortion, and lateral color respectively, of the zoom lens according to Embodiment 2 at an intermediate setting.
Figures 7A, 7B, 7C, 7D:
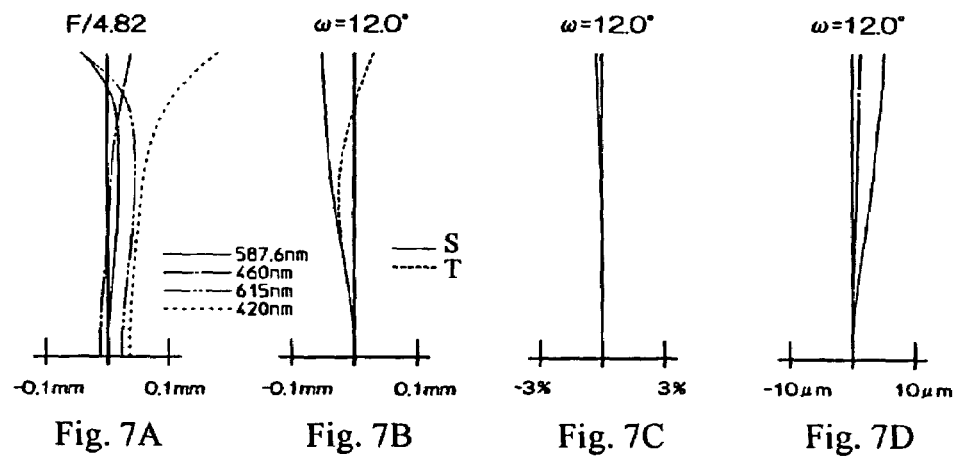
FIGS. 7A–7D show the spherical aberration, astigmatism, distortion, and lateral color, respectively, of the zoom lens according to Embodiment 2 at the telephoto end.

FIGS. 5A–5D show the spherical aberration, astigmatism, distortion, and lateral color, respectively, of the zoom lens of Embodiment 2 at the wide-angle end with a focal length of 6.25 mm. FIGS. 6A–6D show the spherical aberration, astigmatism, distortion, and lateral color, respectively, of the zoom lens of Embodiment 2 at an intermediate setting with a focal length of 8.75 mm. FIGS. 7A–7D show the spherical aberration, astigmatism, distortion, and lateral color, respectively, of the zoom lens of Embodiment 2 at the telephoto end with a focal length of 17.19 mm. In FIGS. 5A, 6A, and 7A, the spherical aberration (in mm) is shown for the wavelengths 587.6 nm (the d-line), 420 nm, 460 nm, and 615 nm, and the f-number is shown. In the remaining figures, ω is the half-field angle. In FIGS. 5B, 6B, and 7B, the astigmatism (in mm) is shown for both the sagittal image surface S and the tangential image surface T and is measured at 587.6 nm (the d-line). In FIGS. 5C, 6C, and 7C, distortion (in percent) is measured at 587.6 nm (the d-line). In FIGS. 5D, 6D, and 7D, the lateral color (in µm) is shown for the wavelengths 420 nm, 460 nm, and 615 nm relative to 587.6 nm (the d-line).

As is apparent from these figures, the various aberrations are favorably corrected over the entire zoom range for the three-group zoom lens of Embodiment 2.

Embodiment 3

Embodiment 3 is very similar to Embodiment 1 and therefore is well shown by FIG. 1. Embodiment 3 differs from Embodiment 1 in its lens element configuration by having different radii of curvature of the lens surfaces, different aspheric coefficients of the aspheric lens surfaces, some different optical element surface spacings, and some different refractive indexes and Abbe numbers.

Table 9 below lists the surface number # in order from the object side, the radius of curvature R (in mm) of each surface on the optical axis, the on-axis surface spacing D (in mm), as well as the refractive index $N_d$ and the Abbe number $ν_d$ (both at the d-line of 587.6 nm) of each optical element for Embodiment 3. Listed in the bottom portion of Table 9 are the focal length f (in mm) and the f-number $F_{NO}$ at the wide-angle and telephoto ends, and the maximum field angle 2ω at the wide-angle end and the telephoto end for Embodiment 3.

TABLE 9

| # | R | D | $N_d$ | $ν_d$ |
|---|---|---|---|---|
| 1* | 189.3226 | 1.10 | 1.80348 | 40.4 |
| 2* | 6.1555 | 2.49 | | |
| 3 | 8.9423 | 2.30 | 1.92286 | 20.9 |
| 4 | 14.5373 | D4 (variable) | | |
| 5 | ∞ | 0.51 | | |
| 6 | 5.9927 | 3.21 | 1.72000 | 50.2 |
| 7 | −5.9927 | 0.56 | 1.67270 | 32.1 |
| 8 | 7.8606 | 0.50 | | |
| 9* | 5.9590 | 1.60 | 1.50842 | 56.4 |
| 10* | 7.8215 | D10 (variable) | | |
| 11 | 105.0026 | 1.88 | 1.50842 | 56.4 |
| 12 | −18.0101 | 3.66 | | |
| 13 | ∞ | 1.05 | 1.51680 | 64.2 |
| f = 6.25–17.19 | | $F_{NO}$ = 2.9–4.9 | 2ω = 62.4°–24.0° | |

The lens surfaces with a * to the right of the surface number in Table 9 are aspheric lens surfaces, and the aspheric surface shape of these lens surfaces is expressed by Equation (A) above.

Table 10 below lists the values of the constant K and the aspheric coefficients $A_3$–$A_{10}$ used in Equation (A) above for each of the aspheric lens surfaces of Table 9. Aspheric coefficients that are not present in Table 10 are zero. An "E" in the data indicates that the number following the "E" is the exponent to the base 10. For example, "1.0E−2" represents the number $1.0 \times 10^{-2}$.

TABLE 10

| # | K | $A_3$ | $A_4$ | $A_5$ | $A_6$ |
|---|---|---|---|---|---|
| 1 | 1.3759990 | 2.4508838E−5 | 1.0295678E−3 | −2.1404924E−4 | −1.0032605E−5 |
| 2 | 1.1871898 | −1.3637633E−4 | 1.2262327E−3 | −3.9829346E−4 | 1.3298525E−5 |
| 9 | −0.0756257 | 0 | 2.7158589E−4 | 0 | −7.1240365E−5 |
| 10 | −3.3388315 | 0 | 3.5778934E−3 | 0 | −4.5225427E−5 |

| # | $A_7$ | $A_8$ | $A_9$ | $A_{10}$ |
|---|---|---|---|---|
| 1 | 7.7873474E−6 | 1.7725720E−7 | −2.5358400E−7 | 2.0250850E−8 |
| 2 | 8.0117067E−6 | 3.0152659E−7 | −2.4017980E−7 | −9.0939892E−9 |
| 9 | 0 | −8.6191785E−6 | 0 | −2.9501283E−8 |
| 10 | 0 | −6.2148798E−6 | 0 | −2.3872097E−8 |

In the zoom lens of Embodiment 3, lens groups G1 and G2 move to vary the separations of the three lens groups during zooming. Therefore, the values of the on-axis spacings D4 and D10 (i.e., the group spacings) vary. Table 11 below lists the values of the variables D4 and D10 (in mm) at the wide-angle end (f=6.25 mm), at an intermediate setting (f=8.75 mm), and at the telephoto end (f=17.19 mm).

TABLE 11

| Focal Length | D4 | D10 |
|---|---|---|
| 6.25 | 16.96 | 6.44 |
| 8.75 | 10.80 | 8.93 |
| 17.19 | 3.25 | 17.34 |

Furthermore, as set forth in Table 12 below, the zoom lens of Embodiment 3 of the present invention satisfies all of Conditions (1) through (4) above.

TABLE 12

| Condition No. | Condition | Value |
|---|---|---|
| (1) | $v3 − v4 > 15$ | 18.1 |
| (2) | $|f3/v3 + f4/v4| < 0.07$ | 0.061 |
| (3) | $|fw/f5| < 0.18$ | 0.165 |
| (4) | $R11/fw > 6.5$ | 16.8 |

Figures 8A, 8B, 8C, 8D:
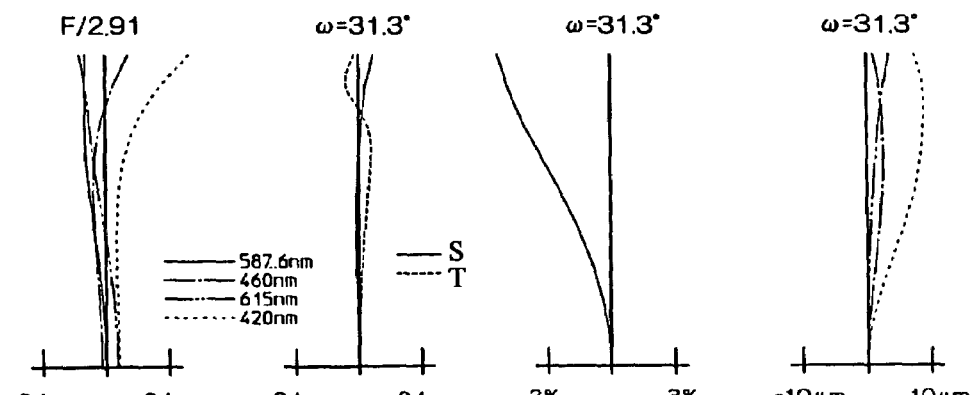
FIGS. 8A–8D show the spherical aberration, astigmatism, distortion, and lateral color, respectively, of the zoom lens according to Embodiment 3 at the wide-angle end.
Figures 9A, 9B, 9C, 9D:
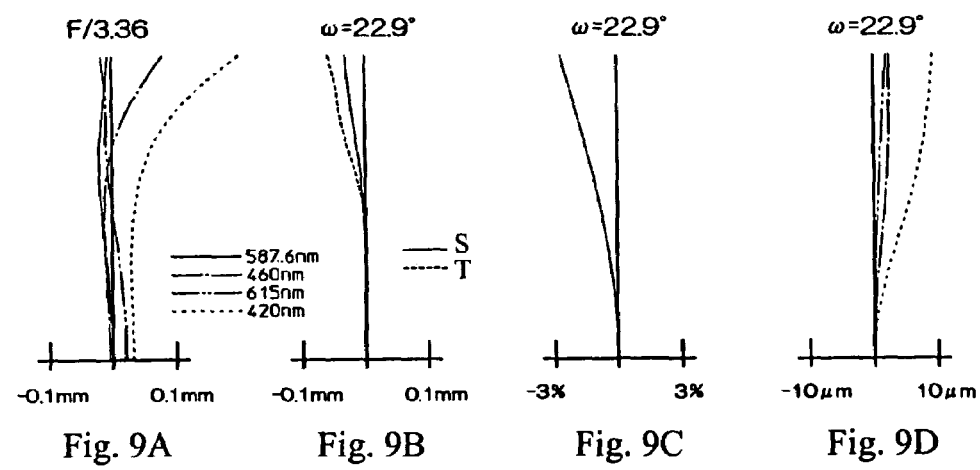
FIGS. 9A–9D show the spherical aberration, astigmatism, distortion, and lateral color, respectively, of the zoom lens according to Embodiment 3 at an intermediate setting.
Figures 10A, 10B, 10C, 10D:
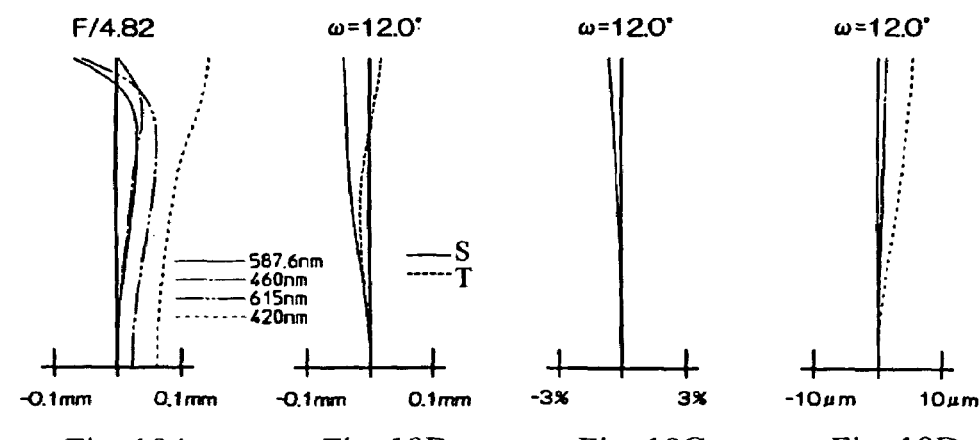
FIGS. 10A–10D show the spherical aberration, astigmatism, distortion, and lateral color, respectively, of the zoom lens according to Embodiment 3 at the telephoto end.

FIGS. 8A–8D show the spherical aberration, astigmatism, distortion, and lateral color, respectively, of the zoom lens of Embodiment 3 at the wide-angle end with a focal length of 6.25 mm. FIGS. 9A–9D show the spherical aberration, astigmatism, distortion, and lateral color, respectively, of the zoom lens of Embodiment 3 at an intermediate setting with a focal length of 8.75 mm. FIGS. 10A–10D show the spherical aberration, astigmatism, distortion, and lateral color, respectively, of the zoom lens of Embodiment 3 at the telephoto end with a focal length of 17.19 mm. In FIGS. 8A, 9A, and 10A, the spherical aberration (in mm) is shown for the wavelengths 587.6 nm (the d-line), 420 nm, 460 nm, and 615 nm, and the f-number is shown. In the remaining figures, ω is the half-field angle. In FIGS. 8B, 9B, and 10B, the astigmatism (in mm) is shown for both the sagittal image surface S and the tangential image surface T and is measured at 587.6 nm (the d-line). In FIGS. 8C, 9C, and 10C, distortion (in percent) is measured at 587.6 nm (the d-line). In FIGS. 8D, 9D, and 10D, the lateral color (in μm) is shown for the wavelengths 420 nm, 460 nm, and 615 nm relative to 587.6 nm (the d-line).

As is apparent from these figures, the various aberrations are favorably corrected over the entire zoom range for the three-group zoom lens of Embodiment 3.

The present invention is not limited to the aforementioned embodiments, as it will be immediately apparent that various alternative implementations are possible. For instance, values such as the radius of curvature R of each of the lens components and lens elements, the shapes of the aspheric lens surfaces, the surface spacings D, the refractive index $N_d$, and Abbe number $v_d$ of the lens elements are not limited to those indicated in each of the aforementioned embodiments, as other values can be adopted. Such variations are not to be regarded as a departure from the spirit and scope of the present invention. Rather, the scope of the present invention shall be defined as set forth in the following claims and their legal equivalents. All such modifications as would be obvious to one skilled in the art are intended to be included within the scope of the following claims.

What is claimed is:

1. A zoom lens having an image side and an object side and formed of only three lens groups arranged along an optical axis in order from the object side as follows:

a first lens group having negative refractive power and including an aspheric surface;

a second lens group having positive refractive power and including an aspheric surface; and a third lens group having positive refractive power; wherein the second lens group includes a stop that controls the amount of light that passes through the zoom lens;

when zooming from the wide-angle end to the telephoto end, the first lens group moves closer to the second lens group and the second lens group moves relative to the third lens group so that the second lens group and the third lens group become farther apart;

the third lens group moves toward the object side during focusing from a distant object to a nearby object;

the first lens group includes, in order from the object side, a lens element having negative refractive power and a lens element having positive refractive power;

the second lens group includes, in order from the object side, a biconvex lens element, a biconcave lens element cemented to the biconvex lens element, and a lens element that forms a separate lens component having positive refractive power and is made of plastic;

the third lens group consists of a single lens element having positive refractive power and made of plastic; and the following conditions are satisfied:

$v3−v4>15$ $|f3/v3+f4/v4|<0.07$ $fw/|f5|<0.18$ where
- ν3 is the Abbe number at the d-line of said biconvex lens element;
- ν4 is the Abbe number at the d-line of said biconcave lens element;
- f3 is the focal length of said biconvex lens element;
- f4 is the focal length of said biconcave lens element;
- fw is the focal length of the zoom lens at the wide-angle end; and
- f5 is the focal length of the separate lens component of the second lens group.

2. The zoom lens of claim 1, wherein the lens element of the second lens group that forms a separate lens component includes an aspheric surface.

3. The zoom lens of claim 1, wherein the zoom lens includes only five lens components.

4. The zoom lens of claim 3, wherein the zoom lens includes only six lens elements.

5. The zoom lens of claim 1, wherein the zoom lens includes only six lens elements.

6. The zoom lens of claim 2, wherein the zoom lens includes only five lens components.

7. The zoom lens of claim 6, wherein the zoom lens includes only six lens elements.

8. The zoom lens of claim 2, wherein the zoom lens includes only six lens elements.

9. The zoom lens of claim 1, wherein the following condition is also satisfied:

$$R11/fw > 6.5$$

where
- R11 is the radius of curvature of the object-side surface of said single lens element.

10. The zoom lens of claim 9, wherein the lens element of the second lens group that forms a separate lens component includes an aspheric surface.

11. The zoom lens of claim 9, wherein the zoom lens includes only five lens components.

12. The zoom lens of claim 9, wherein the zoom lens includes only six lens elements.

* * * * *